(12) United States Patent
Batni

(10) Patent No.: US 12,120,122 B2
(45) Date of Patent: Oct. 15, 2024

(54) PROCESSING AUTHENTICATION REQUESTS FOR UNIFIED ACCESS MANAGEMENT SYSTEMS AND APPLICATIONS

(71) Applicant: NVIDIA Corporation, Santa Clara, CA (US)

(72) Inventor: Dhruva Lakshmana Rao Batni, Bothell, WA (US)

(73) Assignee: NVIDIA Corporation, Santa Clara, CA (US)

(*) Notice: Subject to any disclaimer, the term of this patent is extended or adjusted under 35 U.S.C. 154(b) by 295 days.

(21) Appl. No.: 17/869,641

(22) Filed: Jul. 20, 2022

(65) Prior Publication Data

US 2024/0031371 A1  Jan. 25, 2024

(51) Int. Cl.
*H04L 67/75* (2022.01)
*H04L 9/40* (2022.01)
*H04W 12/08* (2021.01)

(52) U.S. Cl.
CPC .......... *H04L 63/102* (2013.01); *H04L 63/105* (2013.01)

(58) Field of Classification Search
CPC .............................. H04L 63/102; H04L 63/105
See application file for complete search history.

(56) References Cited

U.S. PATENT DOCUMENTS

| | | | |
|---|---|---|---|
| 11,750,597 B2 | 9/2023 | Marzorati et al. | |
| 11,818,227 B1* | 11/2023 | Kumar | H04L 41/16 |
| 2019/0089698 A1* | 3/2019 | Mathew | H04L 63/0838 |
| 2019/0364051 A1* | 11/2019 | Ferrans | G06F 16/9024 |
| 2023/0113332 A1 | 4/2023 | Crabtree et al. | |
| 2023/0351028 A1 | 11/2023 | Ponsini et al. | |
| 2024/0004728 A1 | 1/2024 | Hinrichs et al. | |

FOREIGN PATENT DOCUMENTS

GB  2467038 A  * 7/2010  ............. G06F 21/62

OTHER PUBLICATIONS

Xiaogang Wang, Zhenhua Yin; "Research on Cross-platform Unified Resource Access Control Management System"; Publisher: IEEE; 2017 6th International Conference on Computer Science and Network Technology (ICCSNT); Oct. 2017; Conference Paper; pp. 96-101 (Year: 2017).*

* cited by examiner

*Primary Examiner* — Fatoumata Traore
*Assistant Examiner* — Courtney D Fields
(74) *Attorney, Agent, or Firm* — Lowenstein Sandler LLP

(57) ABSTRACT

Disclosed are apparatuses, systems, and techniques that improve efficiency and decrease latency of processing of authorization requests by cloud-based access servers that evaluate access rights to access various cloud-based services. The techniques include but are not limited to generating and processing advanced authorization requests that anticipate future authorization requests that may be generated by cloud-based services. The techniques further include processing of frequently accessed policies and policy data dependencies and preemptive generation and processing of authorization requests that are replicated from existing authorization requests.

20 Claims, 9 Drawing Sheets

PROCESSING AUTHENTICATION REQUESTS FOR UNIFIED ACCESS MANAGEMENT SYSTEMS AND APPLICATIONS

TECHNICAL FIELD

At least one embodiment pertains to processing resources that are used to evaluate authentication requests by a cloud access service. For example, at least one embodiment pertains to decreasing latency in processing authentication requests using advanced requests that anticipate future authentication requests and performing request preprocessing by pre-loading dependent data that is likely to be used in processing of the anticipated authentication requests. At least one embodiment pertains to using various triggering events to pre-process authorization requests associated with frequently invoked access policies. At least one embodiment pertains to deploying a replay service to use a processing snapshot obtained from an access server to generate and evaluate additional authorization requests that are likely to be generated by the cloud service in the future.

BACKGROUND

Various cloud-based services (e.g., gaming services, streaming services, database services, etc.) have to authenticate various users (e.g., subscribers to the services) when the users log in to the services and request access to specific resources, such as a movie, a video game, an online version of a magazine, and the like. Modern cloud services often offload processing of such authentication requests to specialized cloud-based access servers. A typical user request from a user trying to access a particular resource causes the cloud-based service to generate an authentication request and forward the authentication request to the specialized access server. The access server can fetch various data pertinent to the authentication request and determine whether the authentication request is to be granted or denied, and communicate the determination to the cloud-based services. The cloud-based services, having received the determination, can allow the user access to the requested resource, deny access to the resource, offer the user an expanded subscription plan that includes access to the requested resource, or to take any other suitable action.

DETAILED DESCRIPTION

Figure 1A:
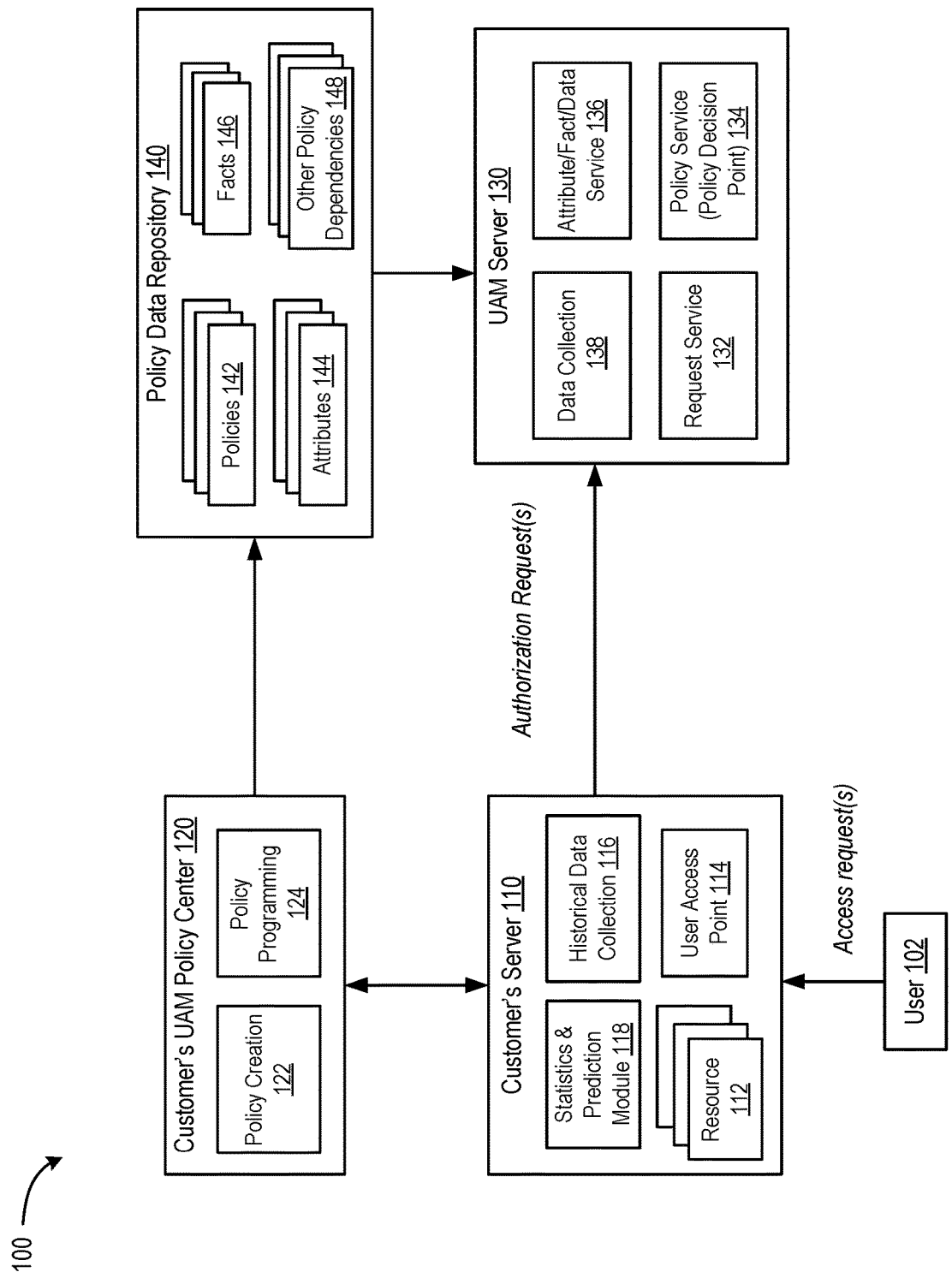
FIG. 1A is a block diagram of an example cloud architecture capable of efficient processing of authorization requests generated in the course of user interactions with cloud-based services, according to at least one embodiment.

Cloud-based access servers, such as Universal Access Management (UAM) servers, often have to concurrently process a large number of authentication requests contemporaneously. In some applications, almost every access attempt or an action by a user can result in an authentication request being sent to the UAM server. Authorization requests can be processed using various methods of access control, such as row and column access control (RCAC), role-based access control (RBAC), attribute-based access control (ABAC), and so on. For example, an RCAC system can store access policies in the form of access tables with various rows (and/or columns) specifying access rights of users to various information referenced in these rows (and/or columns), e.g., access rights of different staff members of a hospital to multiple categories of patient data. An RBAC system can define various user attributes, such as job titles, seniority level, security clearances, locations where access requests originate, and so on. The ABAC infrastructure greatly expands the available attribute space to a practically unlimited space of fixed or changeable information. Any number of policies can be defined that control access to various resources of a cloud-based Customer (e.g., streaming service, a gaming service, a hospital network, a database subscription service, and so on). A Customer or a UAM server can maintain a library of policies that establish access rights for various applications and resources provided by Customer. Each policy may be conditioned on a number of facts (e.g., any static data about services offered by Customer, network environment, governmental regulations, etc.) and any other number of data dependencies (e.g., specific subscription plans, security requirements, time of day, day of week, and so on.). Any of the data dependencies can be used as policy attributes when handling user access requests and requests for actions, e.g., a request by a user to watch a movie, play a video game, perform a search in a confidential database, and so on.

Attributes can be any characteristics or values associated with a user request. ABAC analyzes the attributes associated with the user request in view of various rules established by the relevant policies. The rules/policies define which attributes or combinations of attributes are required for the user to be granted access to a requested resource (e.g., a movie or an address of a patient) or to successfully perform an action (e.g., add a database entry). For example, attributes can include a current subscription plan of the user, a job title of the user, a business unit of the user, a type of the action attempted (download, view, read, write, execute, etc.), day of the week, time of day, or any other static or dynamic information.

UAM policies can be represented by computer codes in Rego language, which is a language supported by Open Policy Agent, or any other suitable language. A policy can involve any number of attributes, facts, or any other data dependencies, which are often represented using JavaScript Object Notation (JSON) format (e.g., <key, value> pairs).

When a user requests an access to some Customer's resources, Customer forwards an authorization request to the UAM server asking the UAM server to evaluate whether to authorize or deny the user's request. A specific request can invoke one or multiple policies, each policy associated with its relevant dependencies. To perform authorization, the UAM server may download a certain amount of data dependencies (e.g., policies/facts/attributes/etc.) within a relatively short time, and preferably without much latency. A perceptible latency diminishes the user's satisfaction and may even cause the user to drop Customer's services. A large number of users can use a given Customer's cloud-based service. In turn, multiple customers can be supported by a single UAM server. As a result, a UAM server may need to handle a large number of data downloads at the same time, which may increase latency.

Aspects and embodiments of the present disclosure address these and other technological challenges by disclosing methods and systems that decrease latency of cloud-based authentication. More specifically, the instant disclosure describes establishing patterns of user requests made by specific users and/or groups (types) of users. Patterns may be established by analyzing statistics of accesses by the users over a certain time horizon and may include—for example and without limitation—resources accessed (e.g., sitcoms, TV series/shows, video games, etc.), duration of user interactions with Customer's services, times of interaction, order in which various resources are accessed, and so on. These statistics may be collected by Customer's server, stored (on the Customer's server or on a cloud), and evaluated. In particular, when a user makes a request to access a specific (first) resource, the Customer's server may determine, based on previously evaluated historical data, what other requests, when, and in what order the user is likely to make. Customer's server may then generate an additional advanced authorization request (anticipatory hint) associated with an access to those other resources. The advanced authorization request may be sent to the UAM server together with the original authorization request or separately, e.g., at some later time. The UAM server may then download various dependent data for the advanced authorization request (e.g., pertinent policies/facts/attributes, etc.) and evaluate the advanced authorization request before such evaluation is requested. Correspondingly, when the user makes an actual request for the additional resource(s), the UAM server may quickly provide the evaluated advanced request to the Customer's server without perceptible latency.

In some embodiments, the UAM server may pre-download the relevant data for the advanced request but not evaluate this request. Instead, the UAM server may wait for another authorization request from the Customer's server generated when the user actually attempts to access the additional resource(s). In some embodiments, historical data may predict that another (e.g., second, third, etc.) resource will be accessed by a user with a certain confidence score (probability). The Customer's server may then decide whether to generate the corresponding advanced requests.

In some embodiments, the UAM server may collect statistics of invocation of various policies. The collected statistics may then be analyzed (e.g., offline) to identify "hot" policies that are most frequently loaded to handle authorization requests related to a specific user or a group of users, such as employees of the same organization, gamers playing the same video game, and the like. The hot policies may be correlated to the users and may be further correlated to a day/time of day of policy invocation (caused by user requests), such as a start of a workday, nighttime, weekends, etc. Additionally, statistical analysis may reveal cross-correlations between various policies. For example, invocation of policy A may indicate that, with a high confidence, policy B is likely to be invoked within a certain time from invocation of policy B. Furthermore, invocation of a particular policy (e.g., policy A, policy B, etc.) may cause the UAM server to access (e.g., download) some "hot" portion of dependencies (attributes/facts/etc.) for the policy. The hot portion may be user-specific and may be identified in view of specific users (e.g., cross-correlated to user IDs) that are served by Customer's services. The collected and analyzed statistics may be used to preload hot policies/dependencies upon some triggering event. Triggering events may include an occurrence of a certain time of day/week (without waiting for an actual user access), initial authentication of a user (cross-correlated to the policy) on Customer's server, the user accessing some particular resource provided by Customer's server, invocation of other policies (trigger policies), and so on.

In some embodiments, an additional replay server may be deployed to assist the UAM server. The replay server may obtain, from the UAM server, a snapshot associated with processing of one or more authorization requests. The authorization requests may be generated for specific users accessing particular resources. The replay server may use the snapshot to generate preemptive authorization requests, e.g., by modifying existing authorization requests with a new user identity, a new requested resource identity, or both. The replay server may then evaluate various preemptive authorization requests using the snapshot. Correspondingly, when a subsequent authorization request arrives, such a request may have already been evaluated by the replay server. The evaluation of the authorization request may then be provided to Customer's server by the replay server in lieu of a regular evaluation by the UAM server.

The advantages of the disclosed techniques include but are not limited to decreasing latency in handling of authorization requests from a cloud-based Customer service by an UAM server. This improves user satisfaction and efficiency of Customer's cloud-based services and further enables the UAM servers to support multiple Customers and enables Customer to support numerous users (subscribers).

System Architecture

FIG. 1A is a block diagram of an example cloud architecture 100 capable of efficient processing of authorization requests generated in the course of user interactions with cloud-based services, according to at least one embodiment. As depicted in FIG. 1, cloud architecture 100 may support operations of a Customer's server 110 that provides cloud-based customer's services to one or more users by handling authorization requests on a UAM server 130. Various servers and components of cloud architecture 100 may be connected to a network (not shown), which may be a public network (e.g., the Internet), a private network (e.g., a local area network (LAN), or wide area network (WAN)), a wireless network, a personal area network (PAN), or a combination thereof.

Customer's server 110 may be any server, computing device, or a collection of servers and/or computing devices that collectively provide an access to a user 102 to any number of cloud-based resources 112. Similarly, a UAM server 130 may be implemented using any number of computing devices connected via public or private network. Each of the servers and/or computing devices that implement Customer's server 110 and/or UAM server 130 may include a rackmount server, a workstation, a desktop computer, a laptop computer, a smartphone, a tablet computer, a server, or any suitable computing device capable of performing the techniques described herein. Resources 112 supported and provided (to users 102) by Customer's server 110 may include databases, video and/or audio streaming surfaces, video games, online magazines, online libraries, computational software, graphical software, workplace applications, and so on. Users 102 may include individual subscribers to Customer's services, group subscribers, organizational subscribers, institutional subscribers, government users and organizations, and the like. Customer's server 110 may deploy a user access point 114 configured to facilitate interaction with one or more users 102. User access point 114 may include a user interface, which may include a graphical interface (e.g., a screen), and may receive input from any number of input devices (e.g., keyboard, mouse, touchscreen, voice- and motion-activated input devices, and so on) supported by a computing device (desktop computer, workstation, laptop computer, tablet, smartphone, etc.) with which user 102 directly or indirectly interacts. User access point 114 may support any number of application programming interfaces (APIs) that facilitate user interactions with one or more resources 112.

Customer's server 110 may maintain a historical data collection 116, which may include collection of any information pertinent to access requests to resources 112 from any of the users (or groups of users)) of Customer's services. In particular, historical data collection 116 may include user identifications (IDs), times (starting and ending) of user sessions, specific user inputs, listings of resources 112 accessed (or attempted to be accessed) by the users, policies invoked during authorization and execution of user requests, attributes, facts and other data dependencies accessed or downloaded during authorization of user requests. Data collected in historical data collection 116 can be analyzed by statistics and prediction module 118 that may identify patterns and correlations in previous user accesses by various users 102. Statistics and prediction module 118 may correlate user requests with user IDs, correlate user requests made after user initialization with user requests made later in the user session, and so on. For example, a user of a video streaming service may typically view short videos at the beginning of a user session followed by watching a long movie or an episode of a TV series, and so on. A user may play a video game for a certain time followed by listening to new music releases. An employee of an organization may review emails at the beginning of a workday followed by starting a graphics-editing software to work on a current project.

Access to resources 112 may be controlled by various policies established for Customer's services. The policies may be created and maintained by a Customer's UAM policy center 120 (for brevity, policy center 120 herein). Policy center 120 may include a policy creation module 122 that may be used, e.g., by developer(s) of Customer's services, to establish access rights of users 102 to various resources 112, e.g., multiple levels of access, ranges of accessible data, seniority levels, subscription plans, and the like. Policy creation module 122 may work in conjunction with policy programming 124. Policy programming 124 may integrate policies 142 with any suitable policy-dependent attributes 144, facts 146, and/or any other policy dependencies 148. Policy programming 124 may include a compiler that uses any suitable policy programming language, e.g., Rego language or any other programming language. Attributes may refer to any information that is subject to at least occasional changes (e.g., user's subscription plan, seniority levels, etc.) while facts may refer to information that is more static (e.g., user's date of birth, education, licensing data, and the like). It should be understood, however, that no bright line test may exist that separates attributes from facts and that what is considered an attribute in some instances may be classified as a fact in other instances, and vice versa.

Policies 142, attributes 144, facts 146, and/or any other policy dependencies 148 may be stored in a policy data repository 140. Policy data repository 140 may be a persistent storage capable of storing any data and metadata that supports provisioning of Customer's services. Policy data repository 140 may be hosted by one or more storage devices, such as main memory, magnetic or optical storage based disks, tapes, or hard drives, network-attached storage (NAS), storage area networks (SAN), and so forth. Although depicted as separate from Customer's server 110 and UAM server 130, in at least one embodiment policy data repository 140 may be a part of Customer's server 110 and UAM server 130. In at least some embodiments, policy data repository 140 may be a network-attached file server, while in other embodiments policy data repository 140 may be some other type of persistent storage such as an object-oriented database, a relational database, and so forth, that may be hosted by a server machine or one or more different machines coupled to Customer's server 110 and UAM server 130. Policy data repository 140 may be accessible (e.g., over network or a local connection) to UAM server 130.

UAM server 130 may be a computing device (or any set of computing devices) dedicated to process authorization requests generated by Customer's server 110 or may be a server that support multiple customers, e.g., video streaming services, audio streaming services, gaming services, online trading services, banking services, online shopping platforms, and the like. UAM server 130 may process authorization requests generated by Customer's server 110 (e.g., by user access point 114 or some other module or component of Customer's server 110) in response to user requests. In some embodiments, UAM server 130 may include a request service 132 configured to receive authorization requests and identify one or more policies 142 pertinent to the received requests. Identified policies may be downloaded by policy service 134 that may also identify various relevant policy data. An attribute/fact/data service 136 may then be used to download the relevant policy data from policy data repository 140. Policy service 134 may subsequently evaluate the received authorization request and determine if user's access request is to be allowed, denied, or conditionally approved, contingent upon user 102 performing some additional action (e.g., changing a subscription plan, renting a movie, and so on).

A data collection module 138 may keep track of various actions, data downloads, authentication decisions, and the like, and create historical logs that can be transferred to Customer's server 110 to be stored in historical data collection 116. In some embodiments, collected historical data may be stored (or duplicated) on UAM server 130. In such embodiments, UAM server 130 may further host statistics and prediction module 118 that performs statistical evaluation of historical data and determines patterns and correlations in previous accesses by various users 102. In some implementations, statistics and prediction modules operating on UAM server 130 and on Customer's server 110 may exchange information (e.g., be synchronized).

Figure 1B:
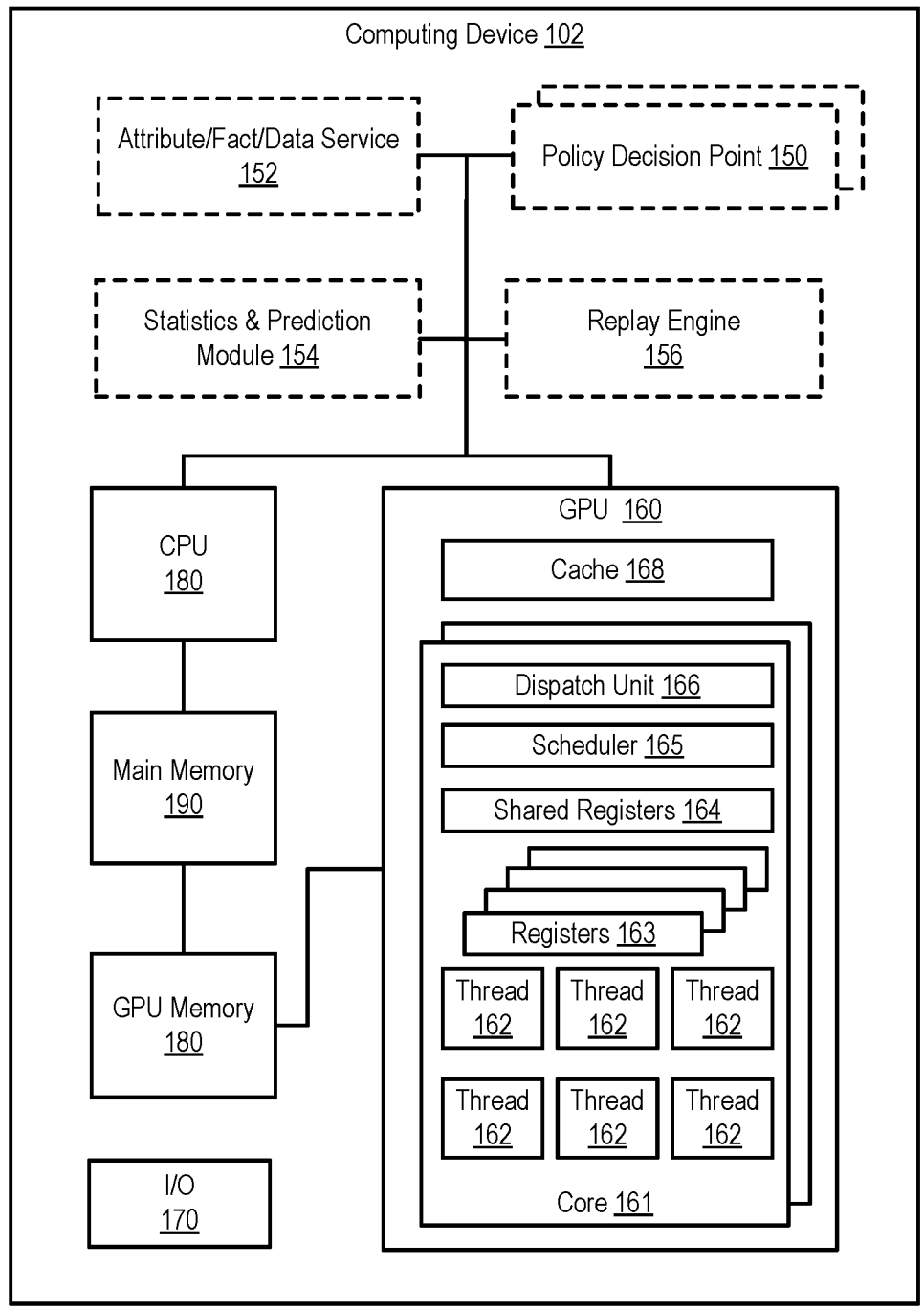
FIG. 1B is an example computing device that may support efficient processing of authorization requests generated in the course of user interactions with cloud-based services, according to at least one embodiment.

FIG. 1B is an example computing device 101 that may support efficient processing of authorization requests generated in the course of user interactions with cloud-based services, according to at least one embodiment. Example computing device 101 may implement Customer's server 110, Customer's UAM policy center 120, UAM server 130, policy repository 140, or any other service as may be disclosed below (e.g., a replay server). Computing device 101 may support any of the engines and services described in conjunction with FIG. 1A and/or FIGS. 2-4 below. For example, computing device 101 may support one or more policy decision points 150, attribute/fact/data service 152, statistics and prediction module 154, a replay engine 156, and other modules, engines, and components referenced in conjunction with FIGS. 2-4. It should be understood (as illustrated schematically with dashed boxed) that only some of the modules, engines, services, and components may be supported by a particular computing device 101 with other components may be supported by other computing devices. Various modules, engines, services, and components supported by computing device 101 may be executed by one or more GPUs 160. In at least one embodiment, a GPU 160 includes multiple cores 161, each core being capable of executing multiple threads 162. Each core may run multiple threads 162 concurrently (e.g., in parallel). In at least one embodiment, threads 162 may have access to registers 163. Registers 163 may be thread-specific registers with access to a register restricted to a respective thread. Additionally, shared registers 164 may be accessed by multiple threads of the core. In at least one embodiment, each core 161 may include a scheduler 165 to distribute computational tasks and processes among different threads 162 of core 161. A dispatch unit 166 may implement scheduled tasks on appropriate threads using correct private registers 163 and shared registers 164. Computing device 101 may include input/output component(s) 170 to facilitate exchange of information with one or more users or developers.

In at least one embodiment, GPU 160 may have a (high-speed) cache 168, access to which may be shared by multiple cores 161. Furthermore, computing device 101 may include a GPU memory 192 where GPU 160 may store intermediate and/or final results (outputs) of various computations performed by GPU 160. After completion of a particular task, GPU 160 (or CPU 180) may move the output to (main) memory 190. In at least one embodiment, CPU 180 may execute processes that involve serial computational tasks (assigned by policy decision points 150) whereas GPU 160 may execute tasks (such as collection of statistics by statistics and prediction module 154) that are amenable to parallel processing. In at least one embodiment, policy decision points 150 and/or replay engine 156 may determine which processes are to be executed on GPU 160 and which processes are to be executed on CPU 180. In other embodiments, CPU 180 may determine which processes are to be executed on GPU 160 and which processes are to be executed on CPU 180.

Cloud-Based Processing of Access Requests

Figure 2:
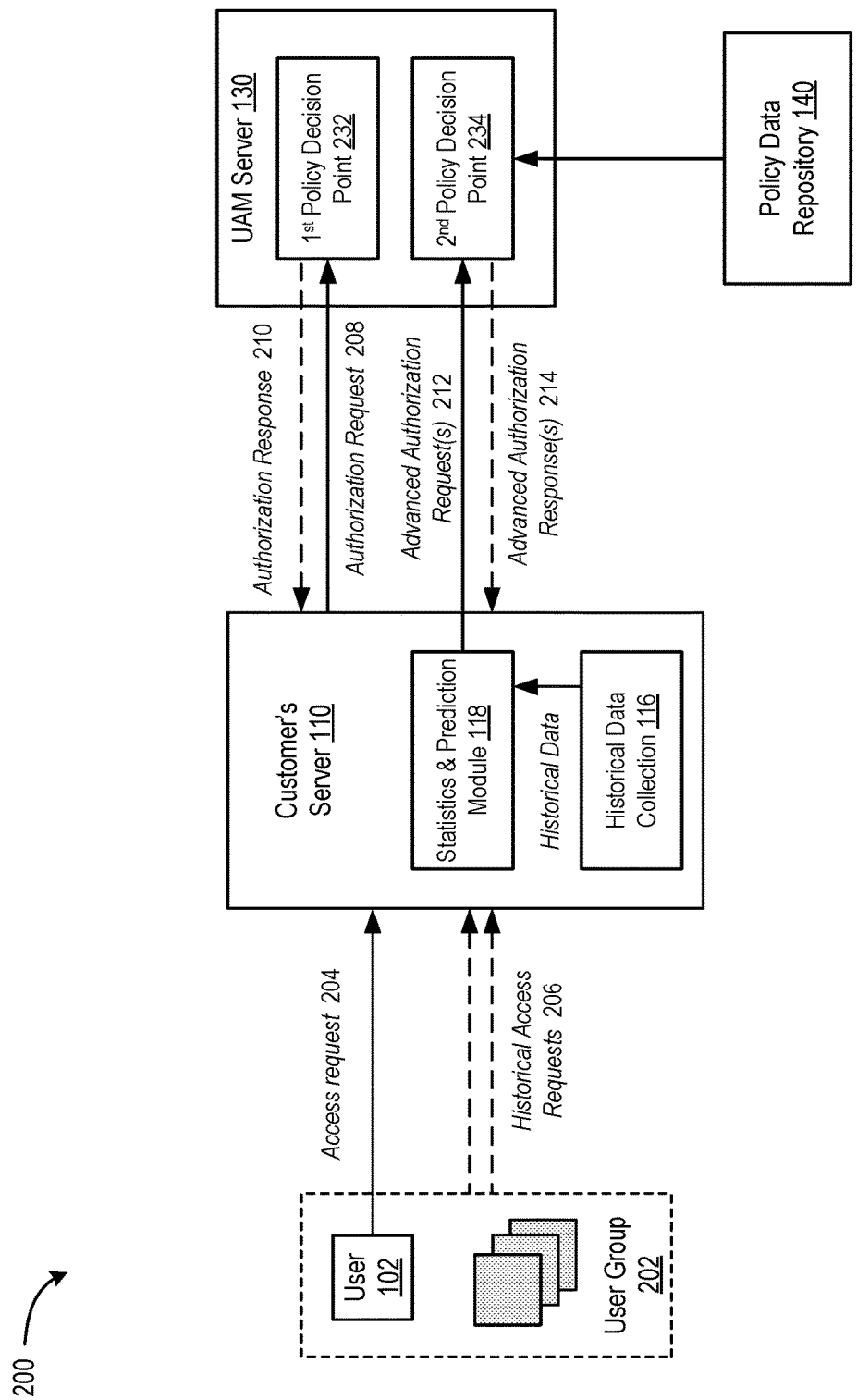
FIG. 2 is a block diagram illustrating example operations performed as part of processing of advanced authorization requests, in accordance with at least some embodiments.

FIG. 2 is a block diagram illustrating example operations 200 performed as part of processing of advanced authorization requests, in accordance with at least some embodiments. Operations 200 may be performed in the course of processing of one or more access requests 204 made by a user 102, e.g., a request to access a work email, computing software, video game, movie, and the like. In some embodiments, user 102 may be a part of a user group 202, which may be any set of users having at least some common pattern(s) of accesses. For example, user group 202 may be a group related by employment (e.g., a group of employees of a particular organization or a specific department of an organization), a group of users related by age, viewership interest, a club dedicated to a specific video game, or any other type of membership. In some embodiments, user 102 may be identified with user group 202, not by any formal membership, but via access patterns that associate user 102 with other users in user group 202. In some instances, user 102 may be unassociated with any user group 202 and may be considered a separate entity.

As depicted in FIG. 2, user 102 may make an access request 204 that may be processed by Customer's server 110 in view of previous (historical) access requests 206 made by user 102 and/or other members of user group 202. Historical access requests 206 may be stored as part of historical data collection 116, e.g., as raw requests (such as specific user inputs) or any representation of access requests. For example, an entry of the historical data collection 116 may include an access request code, a time of the request, a list of policies that were invoked during evaluation of the request, identification of dependent data downloaded during evaluation of the request. Historical data may be indexed by the user ID, access request code, policy, time of the request, duration of the use, or any combination thereof. Data in historical data collection 116 may be processed by a statistics analyzer of statistics and prediction module 118. Statistics and prediction module 118 may create a user profile for user 102. The user profile may include user ID and multiple distributions associated with user activities on Customer's server 110, such as a distribution of times (days) of user access requests, distributions of invocation of specific policies (e.g., as a function of time after user initialization), distribution of downloaded attributes, facts, and/or other dependencies, and the like. Additionally, user profiles may include correlations between various policies invoked during a user session (or within a certain period of the user session, e.g., within the first 30 minutes, 60 minutes, etc., of the user session). For example, if N policies have been invoked during processing of access requests from user 102 over the last 2 weeks (or any other time horizon), statistics and prediction module 118 may construct a table of values $P_{jk}$ that represent a number of times policy k was invoked within a certain time after invocation of policy j. Distributions may be stored in the form of (for example and without limitation): histograms, plots, mathematical formulas, tables, heat maps, or in any computer-readable form.

In some instances, access request 204 may be an initialization request by user 102 trying to establish a user session. In other instances, access request 204 may be an access request made by user 102 after establishing the user session, e.g., an access request for a video game, movie, corporate email server, or any other resource supported by Customer's server 110. Access request 204 may be to access a first resource. (It should be understood that "first," "second," and so on, are intended herein as mere identifiers and do not presuppose any rigid temporal or logical order.) Customer's server 110 may generate an authorization request 208 associated with access request 204, and send authorization request 208 to a UAM server 130 for evaluation. Evaluation may be performed by a first policy decision point 232 (which may be a part of policy service 134, as depicted in FIG. 1). The first policy decision point 232 may retrieve, from policy data repository 140, any pertinent policy data, which may include a first policy (or any additional policies) implicated in authorization request 208, as well as any dependent data, including policy attributes, facts, and any other dependent data associated with the first policy (or any additional policies). Having downloaded the policy data, the first policy decision point 232 may evaluate authorization request 208 and make one of a number of determinations specified in the first policy, e.g., "allow access request 204," "deny access request 204," "conditionally allow access request 204," declare a security breach, offer a modified subscription to user 102, and the like. The evaluated authorization request may be communicated to Customer's server 110 as an authorization response 210.

In addition to the authorization request 208, Customer's server 110 may generate one or more advanced authorization requests 212. More specifically, statistics and prediction module 118 may retrieve previously evaluated historical data from historical data collection 116 and identify, based on the retrieved data, what additional requests, the user 102 is likely to make in the future, which should be broadly understood as encompassing any later instance(s) of time ranging from a fraction of a second to hours after receiving the access request 204. The additional anticipated user requests may be directed to a second (third, etc.) resource provided by Customer's server 110. An access to such resource(s) may be governed by a second (third, etc.) policy. Customer's server 110 may generate one or more advanced authorization requests 212 associated with the anticipated user access requests, and send the advanced authorization request(s) 212 to a UAM server 130 for advanced evaluation. The advanced evaluation may be performed by a second (third, etc.) policy decision point 234. The second policy decision point 234 may download, from policy data repository 140, any pertinent policy data, which may include the second (third, etc.) policy implicated in advanced authorization request(s) 212, as well as any dependent data, including policy attributes, facts, and any other dependent data associated with the first policy (or any number of additional policies). Having downloaded the second policy and the pertinent policy data, UAM server 130 may evaluate the advanced authorization request(s) 212, e.g., as described above in relation to evaluation of the authorization request 208. The evaluated advanced authorization request(s) 212 may be communicated to Customer's server 110 as an advanced authorization response 214. The advanced authorization response(s) 214 may be forwarded to Customer's server 110 together with the authorization response(s) 210 or separately, e.g., via a later communication. Correspondingly, when user 102 makes an actual request for the second resource, the Customer's server 110 will have already received the relevant determinations and may allow (or deny) the user's request without minimal latency.

In some embodiments, statistics and prediction module 118 may include one or more predictive machine learning models (MLMs) trained to generate advanced authorization requests 214. The predictive MLMs may be trained using sets of authorization requests generated by Customer's server 110 (in response to user's access requests 204) during specific user sessions. For example, a set of authorization requests generated during a specific user session may be split into two subsets: a first subset may be used as a training input into the predictive MLM and a second subset may be used as a target output (e.g., a subset of requests that the MLM has to identify based on the first subset). In some embodiments, splitting of authorization requests may be performed randomly, without regard to the chronological order of the requests. In some embodiments, splitting of authorization requests may be performed based on chronology of the requests. For example, first n authorization requests generated during a particular user session, which had N total requests, may be used as the training input while last N-n requests may be used as the target output to be determined by the predictive MLM. Architecture of MLMs for such chronology-based modeling may Recurrent Neural networks, Long Short-Term Memory networks, or any other suitable deep neural networks with memory.

Multiple variations of the disclosed techniques may exist. For example, in some embodiments, UAM server 130 may download data pertinent to advanced authorization request 212, but not immediately make a determination about the validity of the request. Instead, UAM server 130 may wait for an actual user request for the second (third, etc.) resource, which may be generated when user 102 attempts to access the second (third, etc.) resource.

In some embodiments, historical data may predict that the second (third, etc.) resource will be accessed by user 102 with a certain confidence score (probability), e.g., 60%. Customer's server 110 may then decide whether to generate advanced authorization requests. For example, the confidence score may be compared to a threshold score (e.g., 70% or any other score) and a binary determination ("generate" or "wait") may be made. In some embodiments, the threshold score(s) may be dynamic, e.g., dependent on the current load of UAM server 130. If the current load is high, the threshold confidence score may be raised (so that UAM server 130 is not burdened with low-probability requests) and vice versa. In some embodiments, advanced requests may be made closer to the time when such requests become relevant. For example, if the historical pattern for a user is to browse new movie listings for a certain period of time (e.g., ten minutes) and then play a video game, the advanced authorization request for the video game may be sent to UAM server 130 closer to the ten minute mark. In some embodiments, the exact timing of advanced authorization requests may also depend on the current load of UAM server 130. For example, if the load is high, the advanced authorization requests may be sent with longer advance notices (so that UAM server 130 has more time to process the requests).

Although in FIG. 2 historical data collection 116 is collected and maintained on Customer's server 110, in some embodiments, collection and processing of historical data may be performed by UAM server 130.

Figure 3:
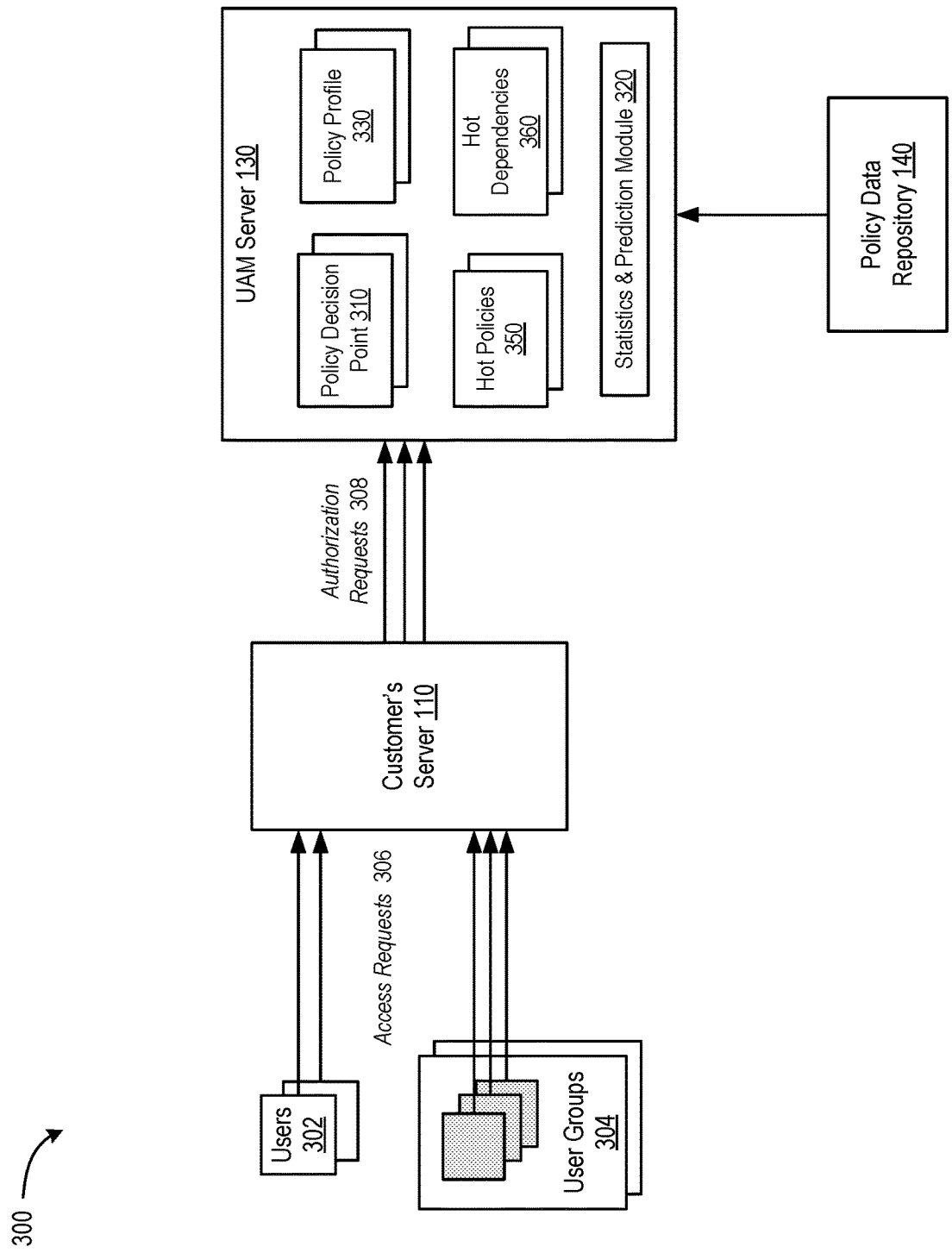
FIG. 3 is a block diagram illustrating example operations performed as part of processing of frequently accessed policies and policy data dependencies, in accordance with at least some embodiments.

FIG. 3 is a block diagram illustrating example operations 300 performed as part of processing of frequently accessed policies and policy data dependencies, in accordance with at least some embodiments. Operations 300 may be performed offline, e.g., based on information collected in the course of processing of one or more access requests 306 made by one or more users 302 and/or user groups 304, which may be any sets of users whose requests are also representative of requests that are made (or likely to be made) by other users in the same group, e.g., a group of employees of the same company, a group of users related by interest, and so on. Access requests 306 may be or include any requests made to access any of the resources provided by Customer's server 110.

Access requests 306 may be processed by Customer's server 110 and translated into authorization requests 308 that are then provided to policy decision points 310 of UAM server 130. Each authorization request 308 may be assigned to one or more policy decision points 310, depending on specific implicated policies. A policy decision point 310 may be a software module or a process that controls access to a specific policy. In some embodiments, each policy may have a dedicated policy decision point 310. In some embodiments, a single policy decision point 310 may handle multiple policies, which may be grouped by a particular resource provided by Customer's server 110, by a specific class of users, and the like.

Statistics and prediction module 320 may analyze authorization requests 308 received over any defined time horizon, e.g., one day, one week, two weeks, and so on, and may further collect information about policies invoked and data downloaded during evaluation of the authorization requests 308. Based on the collected information, statistics and prediction module 320 may compile a policy profile 330 for at least some of the policies invoked over the time horizon. Policy profile(s) 330 may be compiled using UAM tracing data, which may include specific times of invocation of the respective policy (e.g. policy execution start and end times), various dependencies downloaded/retrieved (e.g., attribute keys and fact keys accessed). Policy profile(s) 330 may include correlations between various policies. In some embodiments, correlations may include a number of times (probability) that policy k was invoked within time interval [t, t+τ] from invocation of policy j: $P_{jk}(t, t+\tau)$. Time increment τ may be any suitable value, e.g., 0.1 second, 0.5 second, 1 second, 5 seconds, and the like. Each correlation $P_{jk}$ (t, t+τ) may be further associated with a subset of (hot) dependencies (including facts, attributes, or any other policy dependencies) $\{D_j\}$ of policy j that were accessed during invocation of the respective policy with at least a threshold probability (a fraction of times when a particular dependency $D_j$ was accessed after invocation of policy j), which may be 20%, 50%, 70%, or any other threshold probability. The threshold probabilities may be policy-dependent, e.g., each policy profile 330 may have a policy-specific threshold for hot data dependencies.

Policy profiles 330 may be used to identify hot policies 350, which may include policies that have been invoked, during the time horizon, with at least a threshold frequency. Each hot policy 350 may be stored in association with other policies that are invoked in conjunction with the respective hot policy with at least a threshold probability $P_{policy}$. Each hot policy 350 may be further associated with hot dependencies 360 that have been accessed (during the time horizon) with at least a threshold probability $P_{data}$. In some embodiments, $P_{data}$ may be different from $P_{policy}$. In some embodiments, hot dependencies 360 may be stored in a memory device of UAM server 130 or in any memory device accessible to UAM server 130, e.g. via a fast network or local bus connection. In some embodiments, hot policies 350 may include a predetermined number N of most frequently invoked policies among all policies handled by UAM server 130. Hot dependencies 360 may similarly include up to a certain amount of data dependencies (e.g., up to a certain number of megabytes or gigabytes of data dependencies) that are most frequently accessed (e.g., downloaded) during handing of authorization requests 308 over the time horizon. In some embodiments, hot policies 350 and hot dependencies 360 may be distributed among two or more interconnected UAM servers.

The content of stored hot policies 350 and hot dependencies 360 may be revised on a rolling basis, e.g., every hour, every day, every several days, etc. Policies and data dependencies that are no longer in frequent use may be replaced with other policies and data dependencies that have been in higher use over the time horizon (e.g., the most recent week, the most recent two weeks, and so on).

During online processing of a new authorization request 308 that invokes a specific policy A, a corresponding policy decision point 310 may determine that policy A is one of hot policies 350 and may retrieve hot dependencies 360 associated with this policy A directly from memory of UAM server 130. Additionally, policy decision point 310 may access policy profile 330 of policy A and determine that policy A is cross-correlated with policy B, policy C, and so on. More specifically, policy A profile 330 may indicate that policy B (policy C, etc.) is also to be invoked with probability of 50% (60%, 70%, etc.). Policy decision point 310 may then determine whether policy B (policy C, etc.) dependencies are stored among the hot dependencies 360 on UAM server 130. If policy B (policy C, etc.) dependencies are not stored on UAM server 130, UAM server 130 may download the respective data dependencies from policy data repository 140 and/or other UAM servers accessible to UAM server 130.

Figure 4:
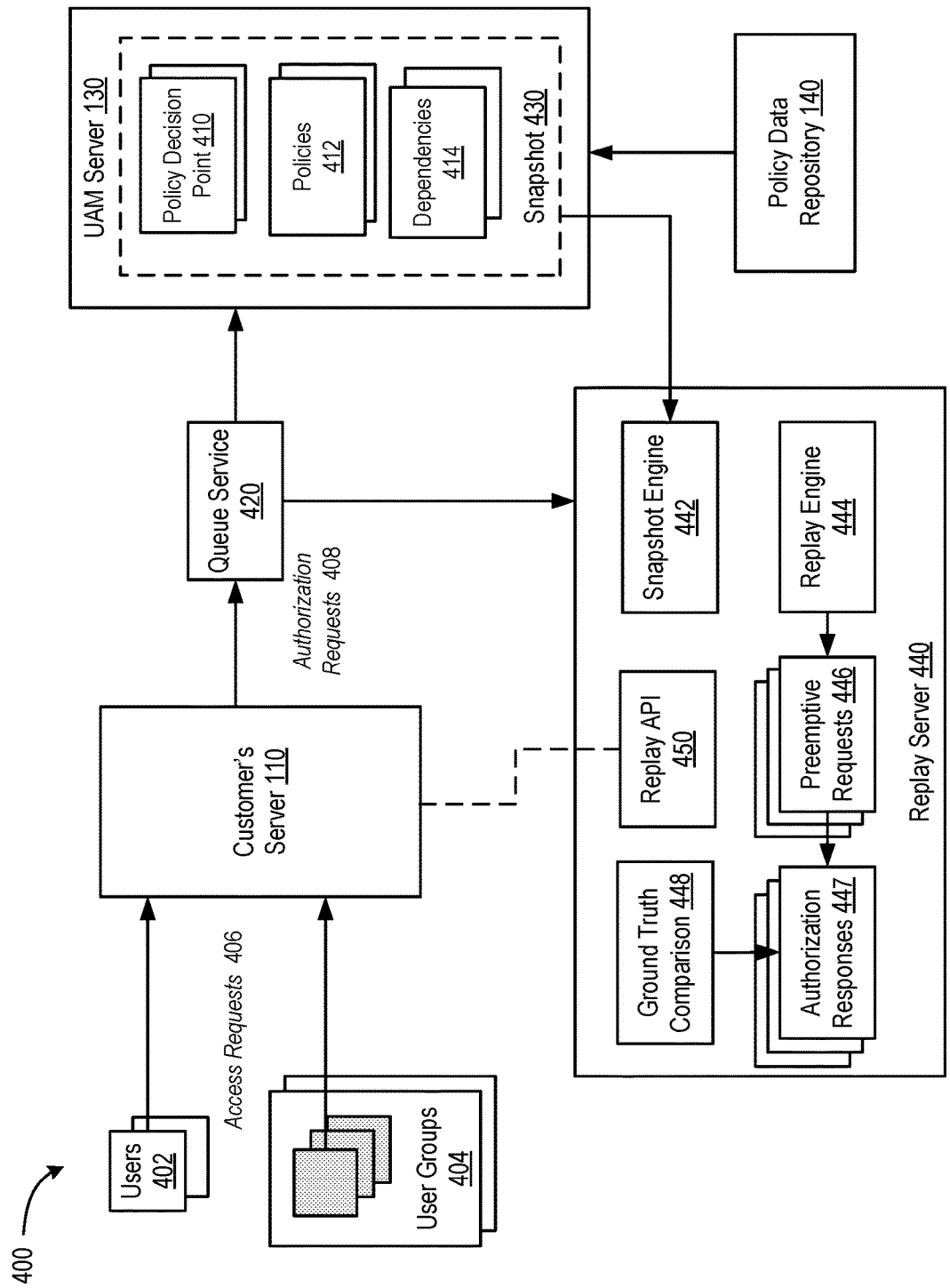
FIG. 4 is a block diagram illustrating example operations of preemptive processing of authorization requests associated with frequently accessed policies and policy data dependencies, in accordance with at least some embodiments.

FIG. 4 is a block diagram illustrating example operations 400 of preemptive processing of authorization requests associated with frequently accessed policies and policy data dependencies, in accordance with at least some embodiments. In some embodiments, operations 400 may be combined with operations 200 of FIG. 2 and/or operations 300 of FIG. 3. Operations 400 may involve deploying a replay server 440 for preemptive processing of anticipated authorization requests informed by processing of actual authorization requests by UAM server 130. More specifically, access requests 406 are made by various users 402 or groups of users 404 (e.g., as described above in conjunction with FIG. 3) to access any of the resources provided by Customer's server 110. Access requests 406 may be processed by Customer's server 110 and translated into authorization requests 408 that are then provided to UAM server 130. In some embodiments, as described in more detail below, authorization requests 408 may be handled by a queue service 420 that separates those requests (among all authorization requests) that are to be handled by UAM server 130 from request that are to be handled by replay server 440.

Each authorization request 308 received by UAM server 130 may be assigned to one or more policy decision points 410, which may access one or more policies 412 and various dependencies 414 (e.g., facts, attributes, and so on) of policies 412, which are stored locally on UAM server 130 or downloaded from policy data repository 140 or from a different UAM server. UAM server 130 may generate a snapshot of a pertinent part of a memory of UAM server 130 that stores various data associated with processing of the specific authorization request. For example, the snapshot $$S(\text{UserID}, \text{ResourceID}, \{P\}, \{D\})$$

may include an identifier of a user that made the underlying access request 406 (UserID). UserID may include any information that identifies the user, a membership group of the user, the session ID of the current session established by the user on Customer's serer 110, the time the user session was started, a network address of the user's computer, geolocation information of the user, or any other suitable information. The snapshot S(.) may further include identification of one or more resources (ResourceID) that the user is attempting to access, one or more policies {P} invoked by the authorization request, and any pertinent set of data dependencies {D} (attributes, facts, etc.) The snapshot S(.) may be taken after any of the policies {P} and data dependencies {D} have been accessed (e.g., downloaded) and loaded into memory of UAM server 130. The one or more policies {P} in the snapshot S(.) may be represented by a respective Rego policy code, by codes that implement the respective policy decision points 410, and the like.

The snapshot S(.) may be provided to a snapshot engine 442 of replay server 440. The snapshot S(.) may have any suitable format, e.g., an archive or a container. In some embodiments, the snapshot S(.) may further include a state of a processing device of UAM server 130 (e.g., a thread of a virtual processor that processes the respective authorization request). Snapshot engine 442 may recreate, using the received snapshot S(.), a computing context of processing of the authorization request on replay server 440, which may include unpacking the snapshot S(.), recreating the processing state from the context, and so on. Although in the above example, a single snapshot S(.) is referenced for conciseness, any number of snapshots may be concurrently (or sequentially) obtained from UAM server 130 and instantiated on replay server 440.

The unpacked snapshot S(.) may be used by a replay engine 444 to generate a set of preemptive requests 446. The preemptive requests 446 may be generated by replacing various data in the snapshot (.) with a substitute data. For example, obtaining a first subset of preemptive requests 446 may involve replacing user identification with an identification of other users, UserID→$UserID_1$, $UserID_2$, etc. Other users may include users belonging to the same membership group, e.g., viewers of the same movie subscription plan, employees belonging to the same department in an organization, gamers belonging to the same online game club, and so on. Replay engine 444 may use a code of policy decision point(s) 410 replicated on replay server 440 and various dependent data received with the snapshot. The first subset of preemptive requests 446 may, therefore, anticipate user requests (that are likely to be made in the future) from other users directed to the same resource. As another example, obtaining a second subset of preemptive requests 446 may involve replacing resource identifications with identification of other resources, ResourceID→$ResourceID_1$, Resource/$D_2$, etc. The second subset of preemptive requests 446 may, therefore, anticipate requests from the same user but directed to other resources. Obtaining a third subset of preemptive requests 446 may involve replacing both the user identification and the resource identifications. The identifications of other users and other resources may be obtained from other snapshots concurrently instantiated on replay server 440. Preemptive requests 446 may be evaluated to obtain corresponding authorization responses 447.

At least some of the evaluated authorization responses 447 may undergo comparison with ground truth (block 448). The ground truth may include actual requests and responses evaluated by UAM server 130. For example, among the snapshots obtained from UAM server 130 may be a snapshot S($UserID_1$, $ResourceID_1$) associated with authorization of a first user's access request to a first resource. Replay engine 444 may use the snapshot S($UserID_1$, $ResourceID_1$) and the corresponding downloaded policies and data dependencies to evaluate preemptive requests from the first user to the second resource ($UserID_1$→$ResourceID_2$), a third resource ($UserID_1$→$ResourceID_3$), etc., and may additionally evaluate preemptive requests from a second user to the first resource ($UserID_2$→$ResourceID_1$), from a third user to the first resource ($UserID_3$→$ResourceID_1$), and so on. In some instances, an actual request from the second user to the first resource may be evaluated by UAM server 130 and received as part of a separate snapshot S($UserID_2$, $ResourceID_1$), which may be used as the ground truth.

In some embodiments, the ground truth may be provided, e.g., as part of testing or development of replay server 440, e.g., by a developer of Customer's server 110. Interaction of the developer with replay server may be facilitated via a replay application programming interface (API) 450 that facilitates access of the developer to operations of snapshot engine 442 and replay engine 444 and allows the developer to generate preemptive authorization requests for new users (users whose requests have not yet been processed by UAM server 130), authorization requests for new resources (resources for which access requests have not yet been processed by UAM server 130), requests for new users to access new resources, and so on. At least some of the generated preemptive requests 446 (e.g., randomly selected) may be evaluated by the developer and used as ground truth for testing accuracy and reliability of replay server 440. In some embodiments, ground truth may be generated without developer's input. For example, a certain number of randomly selected preemptive requests may be directed for processing to UAM server 130 and the outputs of the corresponding evaluations may be used as ground truth for verifying accuracy and reliability of replay server 440 evaluations. In some embodiments, UAM server 130 may be used for preemptive request verification during periods of time when the load of UAM server (e.g., a number of authorization requests per unit of time) is below a predetermined value indicative of a relatively light processing. The ground truth (provided by a developer, UAM server 130, or both) may be used to control veracity of operations of replay server 440. In those instances where the number (e.g., percentage) of incorrectly evaluated preemptive requests 446 is above a threshold value (e.g., 1%, 2%, etc.), replay server 440 may be taken offline for additional testing and/or troubleshooting.

In those instances where replay server 440 is deployed, queue service 420 may selectively direct processing of new authorization requests 408 to UAM server 130 or to replay server 440. In some embodiments, queue service 420 may periodically poll an index maintained by replay engine 444 to determine what users, resources, policies have been preemptively processed and evaluated by replay server 440. For example, replay engine 444 may index a list of preemptive requests 446 that have been evaluated by a specific user, a specific resource, a specific policy, a specific set of dependencies, and so on. In some embodiments, the index may have a hierarchical tree structure. When a new authorization request 408 arrives, queue service 420 may access the index to determine if the respective preemptive request 446 has already been evaluated and stored on replay server 440. If the corresponding preemptive request is available on replay server 440, queue service 420 may forward the new authorization request 408 to replay server 440 that sends back the stored authorization response to Customer's server 110. If the corresponding authorization response is not available on replay server 440, queue service 420 may forward the new authorization request 408 to UAM server 130 for regular processing.

Multiple variations of the embodiments disclosed in conjunction with FIG. 4 may be used. For example, in some embodiments, replay server 440 may be implemented as part of Customer's server 110 or as part of UAM server 130. In some embodiments, replay server 440 may be implemented on multiple interacting servers and/or computing devices.

Figure 5:
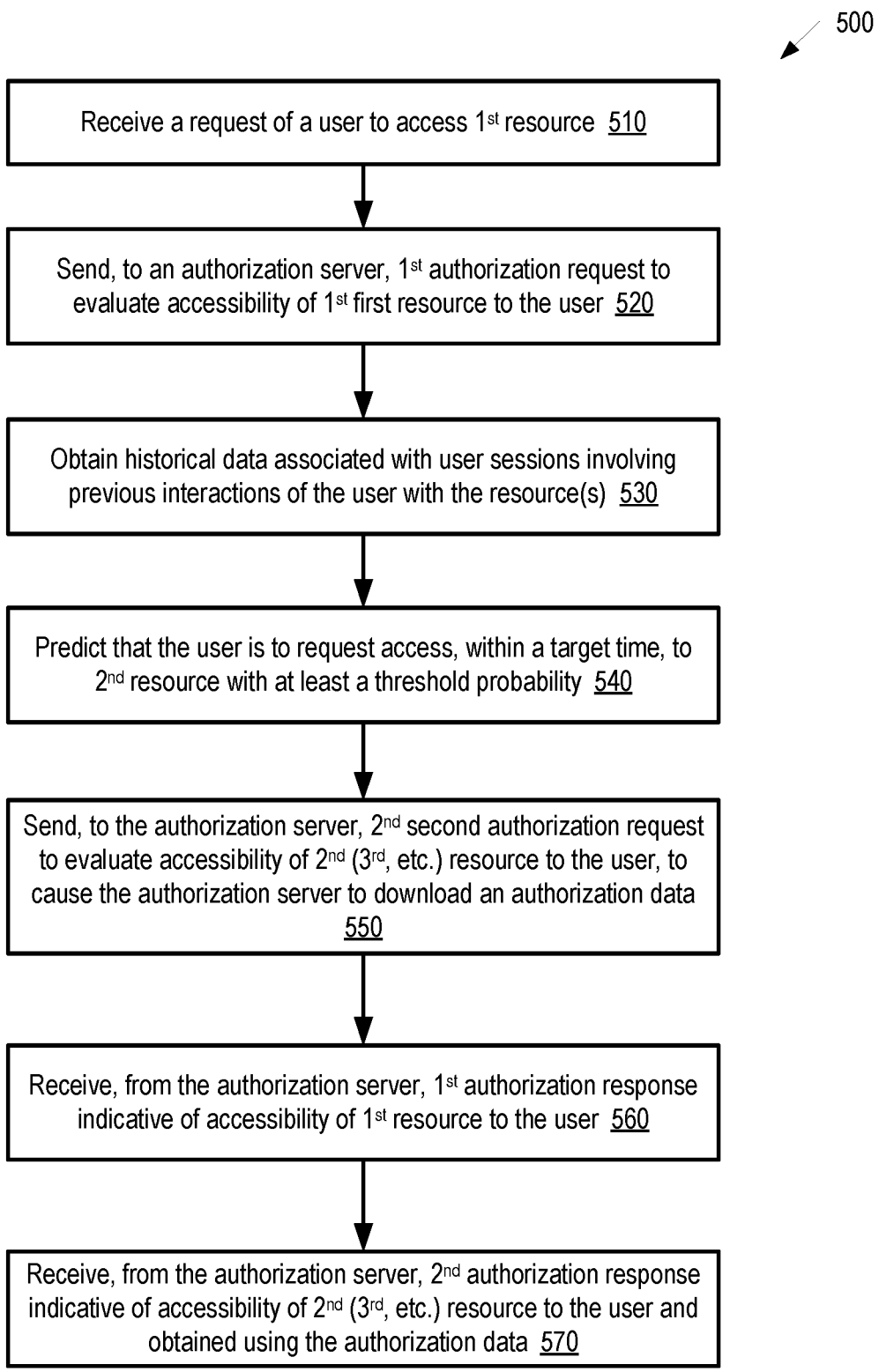
FIG. 5 is a flow diagram of an example method of using advanced authorization requests to improve efficiency of a cloud-based access server, according to at least one embodiment.
Figure 6:
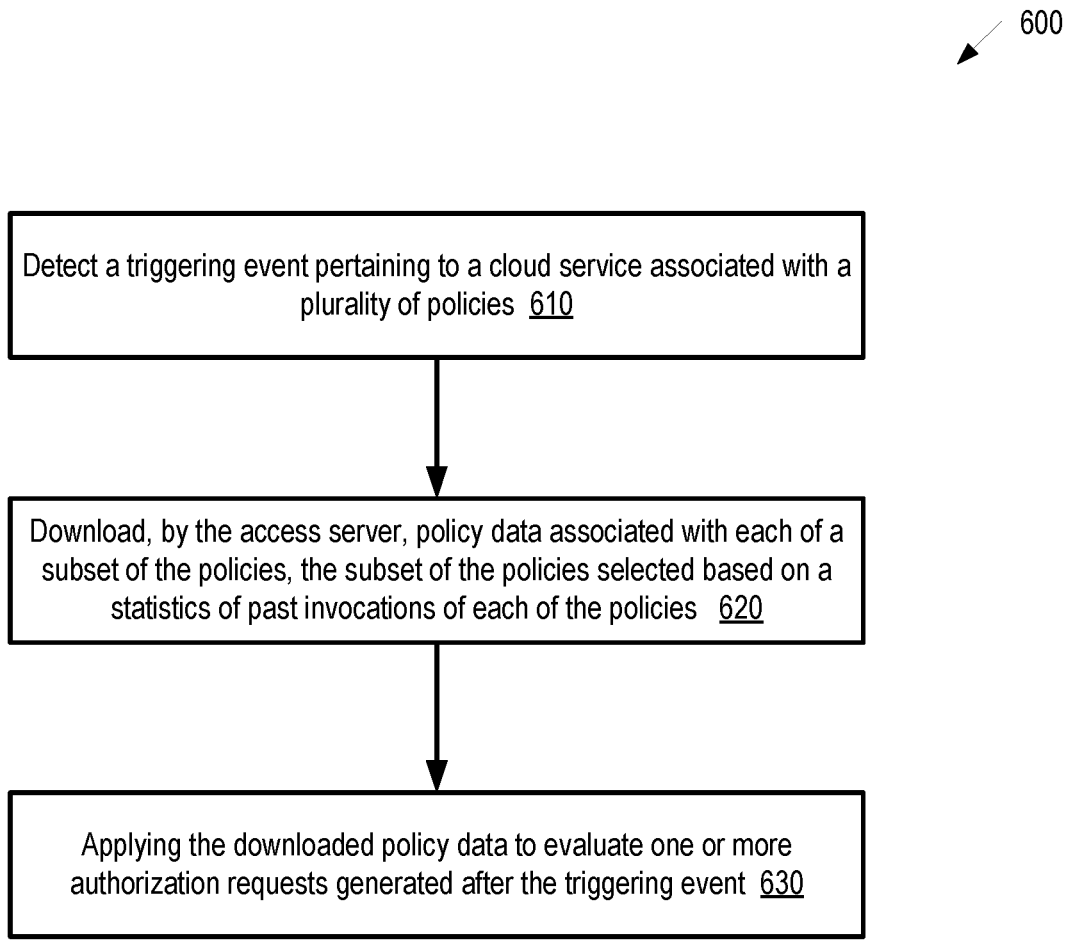
FIG. 6 is a flow diagram of an example method of processing, by an access server, of frequently accessed policies and policy data dependencies, according to at least one embodiment.
Figure 7:
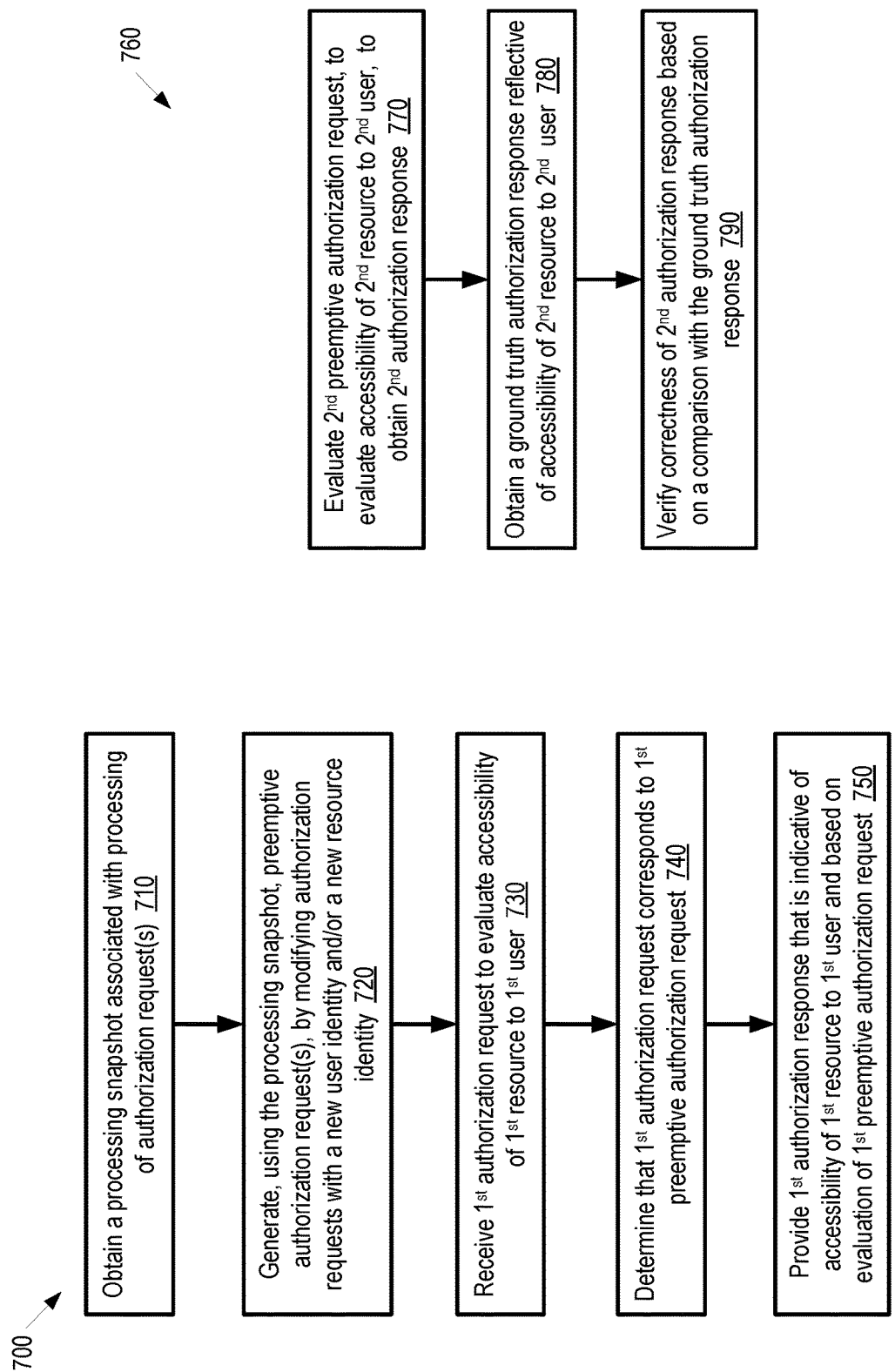
FIG. 7A is a flow diagram of an example method of preemptive generation and processing of authorization requests by cloud-based authentication services, according to at least one embodiment
FIG. 7B is a flow diagram of an example method of validation of preemptive processing of authorization requests using ground truth, according to at least one embodiment.

FIGS. 5-7 are flow diagrams of respective example methods 500-700 that facilitate processing of authorization requests generated in the course of user interactions with cloud-based services, according to some embodiments of the present disclosure. Methods 500-700 may be performed by one or more processing units (e.g., CPUs and/or GPUs), which may include (or communicate with) one or more memory devices. In at least one embodiment, methods 500-700 may be performed by processing units of computing device 101 implementing operation of Customer's server 110, UAM server 130, replay server 440, and so on. In at least one embodiment, methods 500-700 may be performed by multiple processing threads (e.g., CPU threads and/or GPU threads), each thread executing one or more individual functions, routines, subroutines, or operations of the method. In at least one embodiment, processing threads implementing methods 500-700 may be synchronized (e.g., using semaphores, critical sections, and/or other thread synchronization mechanisms). Alternatively, processing threads implementing methods 500-700 may be executed asynchronously with respect to each other. Various operations of methods 500-700 may be performed in a different order compared with the order shown in FIGS. 5-7. Some operations of the methods may be performed concurrently with other operations. In at least one embodiment, one or more operations shown in FIGS. 5-7 may not always be performed.

FIG. 5 is a flow diagram of an example method 500 of using advanced authorization requests to improve efficiency of a cloud-based access server, according to at least one embodiment. Method 500 may be performed in the context of provisioning of streaming services, gaming services, databases services, online library services, cloud-based computing services, and many other contexts. A cloud-based service may provide any number of resources. A resource may be any video file, audio file, database or a database entry, an online magazine or an article in an online magazine, any computer program running on a cloud, and so on. At block 510, processing units performing method 500 may receive a request of a user to access a first resource of a plurality of resources, such as a plurality of resources provided by a cloud-based Customer's server 110, as illustrated in FIGS. 1-4. At block 520, method 500 may continue with sending, to an access server, a first authorization request. In some embodiments, the access server may include one or more UAM servers. The first authorization request may be an authorization request 208 in FIG. 2. The first authorization request may be a request to evaluate an authorization level corresponding to the user for accessing the first resource. The first authorization request may be generated in response to an access request (e.g., access request 204 in FIG. 2) from the user (or user's computing device) to access the first resource. It should be understood that the terms first, second, etc., are used herein as identifiers and do not presuppose any temporal or logical order. In particular, "first authorization request" may but need not be the first (chronologically) authorization request generated by the access server during a specific user session. In some instances, the first authorization request may be (or may include) a request to authenticate the user (e.g., a request to start a new user session on Customer's server 110).

At block 530, method 500 may continue with the processing units obtaining a historical data associated with one or more user sessions involving previous interactions of the user with the plurality of resources. For example, the historical data may include previous authorization requests generated in response to historical access requests 206 in FIG. 2 made by the user (or other users of the same membership group to which the user belongs). In some embodiments, the historical data may include statistics of the user accessing a second (third, etc.) resource over a predetermined historical period of time. In some embodiments, the statistics of the user accessing the second (third, etc.) resource includes correlations between the user accessing the first resource and accessing the second resource. For example, the statistics may include the probability, determined based on previous user accesses, that the user may access the second (third, etc.) resource within a specific time after accessing the first resource.

At block 540, method 500 may continue with the processing units predicting, based on the historical data, that the user will request access, within a target time, to the second resource of the plurality of resources with at least a threshold probability. In some embodiments, the second resource may include at least one of a gaming application, a video streaming application, an audio streaming application, or a database application. The second resource may be supported by a cloud service. In some embodiments, the second resource may be supported by the same cloud service that supports the first resource. In some embodiments, the second resource may be supported by a cloud service that is different from the cloud service that supports the first resource. For example, the first resource may be supported by a movie streaming service while the second resource may be supported by a gaming service.

At block 550, method 500 may continue with sending, to the access server, a second authorization request to evaluate an authorization level corresponding to the user for accessing at least the second resource. The second authorization request may cause the access server to download an authorization data associated with the second authorization request. For example, the second authorization request may be an advanced authorization request (e.g., advanced authorization request 212 in FIG. 2), generated in anticipation of the user's attempt to access the second resource. The authorization data may be downloaded from a policy data repository and may include one or more UAM policies, at least one UAM policy of the one or more UAM policies specifying access rights for the second resource. In some instances, the authorization data may include various policy dependencies, including but not limited to policy attributes, policy facts, and so on.

At block 560, method 500 may include receiving, from the access server, a first authorization response (e.g., authorization response 210 in FIG. 2) indicative of the authorization level corresponding to the user for accessing the first resource. At block 570, method 500 may include receiving, from the access server, a second authorization response indicative of the authorization level corresponding to the user for accessing the second resource, wherein the second authorization response is obtained using the authorization data. For example, the second authorization response may include advanced authorization response 214 in FIG. 2. In some embodiments, the second authorization response may be provided (e.g., to Customer's server 110) as soon as the second authorization request is evaluated. In some embodiments, the second authorization response is not sent immediately after the second authorization request is evaluated. Instead, sending the second authorization response may be delayed until Customer's server 110 server sends, to the access server, a third authorization request, which may be generated (by Customer's server 110) when the user makes an actual attempt to access the second resource. For example, the third authorization request may be a regular request to evaluate accessibility of the second resource to the user, generated by Customer's server in response to the user attempting access to the second resource. Receipt of the third authorization request may cause the access server to send (to Customer's server 110) the previously prepared second authorization response.

Numerous variations of method 500 are within the scope of the present disclosure. In some embodiments, the second authorization request may be to evaluate authorization level corresponding to the user for accessing multiple resources, e.g., the second resource, a third resource, and so on. For example, the first authorization request may be sent to the access server to authenticate the new user's session and the second authorization request (an advanced authorization request) may be sent in anticipation of the user accessing multiple resources, e.g., video game services, movie streaming services, audio streaming services, and so on. In such embodiments, the second, third, etc., authorization response indicative of authorization level corresponding to the user for accessing the second, third, etc., resource to the user may be prepared by the access server using the downloaded authorization data. The second, third, etc., authorization response may be provided to (and may be received by) Customer's server 110 as soon as the respective authorization request is processed by the access server or after a specific request for the second, third, etc., resource is received from the user.

FIG. 6 is a flow diagram of an example method 600 of processing, by an access server, of frequently accessed policies and policy data dependencies, according to at least one embodiment. At block 610, processing units of an access server (e.g., UAM server 130 in FIG. 3) performing method 600 may detect a triggering event pertaining to a cloud service associated with a plurality of policies. In some embodiments, at least one policy of the plurality of policies may be associated with a corresponding policy data (e.g., attributes, facts, and other data dependencies). The access server may be independent of the cloud service. For example, as illustrated in FIG. 3, the UAM server 130 may be an entity that provides authentication services to Customer's server 110 and to any additional number of related or unrelated cloud-based services. In some embodiments, the cloud service may support at least one of a gaming application, a video streaming application, an audio streaming application, or a database application. In some embodiments, the plurality of policies of the cloud service may be UAM policies that specify access rights for the cloud service.

The triggering event may be any event, broadly understood, that is associated with one or more users accessing the cloud service. For example, the triggering event may include detecting an initialization request for a user accessing the cloud service, e.g., a user logging in to the cloud service. In some instances, the triggering event may be or include a time associated with an anticipated access of the cloud service by a user. For example, if it is known (based on historical data) that on most days, a specific user logs in to the cloud service shortly after 8 pm, the triggering event may be the daily occurrence of that time (8 pm). In some embodiments, the triggering event may include an invocation of a trigger policy, which may be any policy associated with the user activity. For example, at the beginning of each new user session, the user is likely to browse new movie or song releases. Correspondingly, a policy that controls access to such listings may be a trigger policy for various additional policies that future user's access requests are likely to invoke.

At block 620, the processing units of the access server performing method 600 may download policy data associated with at least one policy of a subset of policies (e.g., hot policies 350 in FIG. 3) of the plurality of policies of the cloud service. Downloading policy data may be responsive to detecting the triggering event and may occur prior to receiving one or more authorization requests to access a resource provided by the cloud service. The downloaded policy data may include at least a portion of the policy data (e.g., hot dependencies 360 in FIG. 3) associated with at least one policy of the subset of (hot) policies. In some embodiments, the downloaded policy data associated with at least one policy of the subset of (hot) policies may include a portion of stored policy data accessed, during handling of the past authorization requests, with at least a threshold frequency.

The subset of (hot) policies may be selected based on one or more statistics of invocation of one or more policies plurality of policies applied during handling of past authorization requests received over a predetermined interval of time (e.g., the last week, the last 10 days, the last month, and so on). In some embodiments, the subset of (hot) policies may be selected in view of a number of times at least one policy of the subset of policies was invoked during handling of the past authorization requests received over the predetermined interval of time.

In some embodiments, the subset of (hot) policies may include a first policy and a second policy. The second policy may be invoked, in conjunction with the first policy, with at least a threshold probability over the predetermined interval of time. In some embodiments, the statistics of invocation may include one or more correlations between at least some of the policies of the subset of (hot) policies.

At block 630, the processing units of the access server performing method 600 may apply the downloaded policy data to evaluate the one or more authorization requests generated after the triggering event. In some instances, such authorization requests may be generated by the cloud service (e.g., by the Customer's server 110) in response to a user requesting an access to the cloud service. For example, the triggering event may be an occurrence of a specific time of anticipated user's initialization on the cloud service (e.g., user starting a new user session). In anticipation of the user's initialization, the access server may pre-download the relevant policy data. When the user performs the actual initialization and/or requests specific resources of the cloud service and the cloud service generates the actual authorization request(s), the access server may quickly process such requests using the pre-downloaded policy data.

FIG. 7A is a flow diagram of an example method 700 of preemptive generation and processing of authorization requests by cloud-based authentication services, according to at least one embodiment. At block 710, processing units performing method 700 (e.g., processing units of relay server 440 in FIG. 4) may obtain, from an access server, a processing snapshot (e.g., snapshot 430). In some embodiments, the access server may be or include a unified access management (UAM) server (e.g., UAM server 130). The processing snapshot may be associated with processing one or more authorization requests (e.g., authorization requests 408 previously received from Customer's server 110). At least one request of the one or more authorization requests may be to evaluate the accessibility—e.g., an authorization or authorization level—of a user to a requesting user of a cloud service, of a requested resource of a plurality of resources supported by the cloud service. The processing snapshot may include any portion of memory of the access server and a state of one or more processors (e.g., virtual processors) of the access server that process the authorization requests. The processing snapshot may include memory state(s) and/or processor state(s) associated with processing of any number of authorization requests. The authorization requests may pertain to a single user or to any number of users. Similarly, the authorization requests may be for a single resource or for any number of resources. Any of the authorization requests may be for resources that include a gaming application, a video streaming application, an audio streaming application, or a database application.

In some embodiments, the processing snapshot may include one or more policy codes (e.g., Open Access Agent Rego policy codes) executed by the access server during processing of the one or more authorization requests. At least one policy code of the one or more policy codes may implement a respective policy specifying access rights for at least one resource of the plurality of resources supported by the cloud service. In some embodiments, a single policy code may implement multiple policies. In some embodiments, the processing snapshot may further include at least one policy dependency (e.g., attributes, facts, and other dependencies) referenced in the one or more policy codes executed by the access server.

At block 720, method 700 may continue with the processing units generating, using the processing snapshot, a plurality of preemptive authorization requests (e.g., preemptive requests 446). At least one preemptive request of the plurality of preemptive authorization requests may be generated by modifying an authorization request of the one or more authorization requests (e.g., received with the processing snapshot) with at least one of a new requesting user identity or a new requested resource identity. For example, a specific authorization request, whose processing is reflected in snapshot 430, may be used to generate one subset of preemptive authorization requests for the same users requesting access to different resources, another subset of preemptive authorization requests for different users requesting access to the same resources, yet another subset of preemptive authorization requests for different users requesting access to different resources, and so on.

At block 730, method 700 may continue with the processing units receiving, from the cloud service, a first authorization request to evaluate an authorization of a first user to access a first resource of the plurality of resources of the cloud service. It should be understood that "first" is used as a mere identifier here and does not presuppose any temporal order. For example, the first authorization request may be output by Customer's server (e.g., Customer's server 110) after outputting the one or more authorization requests referenced in conjunction with blocks 710 and 720.

At block 740, method 700 may continue with determining (e.g., using queue service 420) that the first authorization request corresponds to a first preemptive authorization request of the generated plurality of preemptive authorization requests. At block 750, method 700 may continue with providing, to the cloud service, a first authorization response (e.g., one of authorization responses 447) indicative of an authorization of the first user to access the first resource. The first authorization response may be based on evaluation of the first preemptive authorization request. In some embodiments, the first preemptive authorization request may be evaluated (e.g., by replay engine 444) to obtain the first authorization response prior to receiving the first authorization request, e.g. right after the first preemptive authorization request has been generated. In some embodiments, the first preemptive authorization request may be generated and stored until the first authorization request is received, at which point the first preemptive authorization request may be evaluated (e.g., by replay engine 444) to obtain the first authorization response and then provided to Customer's server 110.

In some embodiments, the operations of blocks 710-750 may be performed by various components of a replay server (e.g., snapshot engine 442, replay engine 444, and so on). In particular, the first preemptive authorization request may be generated by a replay server (replay server 440) that is different from the access server (e.g., UAM server 130). In some embodiments, the first authorization request may be received by the replay server responsive to determining (e.g., by queue service 420) that the first preemptive authorization request has already been generated (and, in some embodiments, evaluated) by the replay server and is, therefore, capable of being provided to Customer's server with minimal latency.

FIG. 7B is a flow diagram of an example method 760 of validation of preemptive processing of authorization requests using ground truth, according to at least one embodiment. In some embodiments, method 760 may be performed in conjunction with method 700 of FIG. 7A, e.g., as part of online or offline testing or periodic validation of a replay server. At block 770, processing units performing method 760 (e.g., processing units of replay server 440 in FIG. 4) may evaluate a second preemptive authorization request to obtain a second authorization response. The second preemptive authorization request may be to evaluate an authorization corresponding to a second user to access a second resource. It should be understood that "second" is used as a mere identifier. In particular, any number of intervening authorization requests may be processed between the first authorization request and the second authorization request. In some instances, the second authorization request may precede the first authorization request. Furthermore, the first authorization request and the second authorization request may be associated with different users and/or directed to different resources. In some embodiments, an authorization request that is used for validation of the replay server (the second authorization request) may be selected randomly.

At block 780, processing units performing method 760 may obtain, from the access server, a ground truth authorization response reflective of the authorization corresponding to the second user to access the second resource. For example the ground truth authorization response may be a response obtained by UAM server 130 in the course of a regular evaluation of the second authorization request.

At block 790, processing units performing method 760 may verify correctness of the second authorization response based on a comparison of the second authorization response and the ground truth authorization response. If the second authorization response and the ground truth authorization response are the same (e.g., both "allow access" or both "deny access" responses), the accuracy of the replay server may be positively validated. In the instances where the second authorization response and the ground truth authorization response differ from each other, the replay server may be taken offline for testing or reconfiguring. In the meantime, with further authorization requests 408 being routed away from the replay server.

Figure 8:
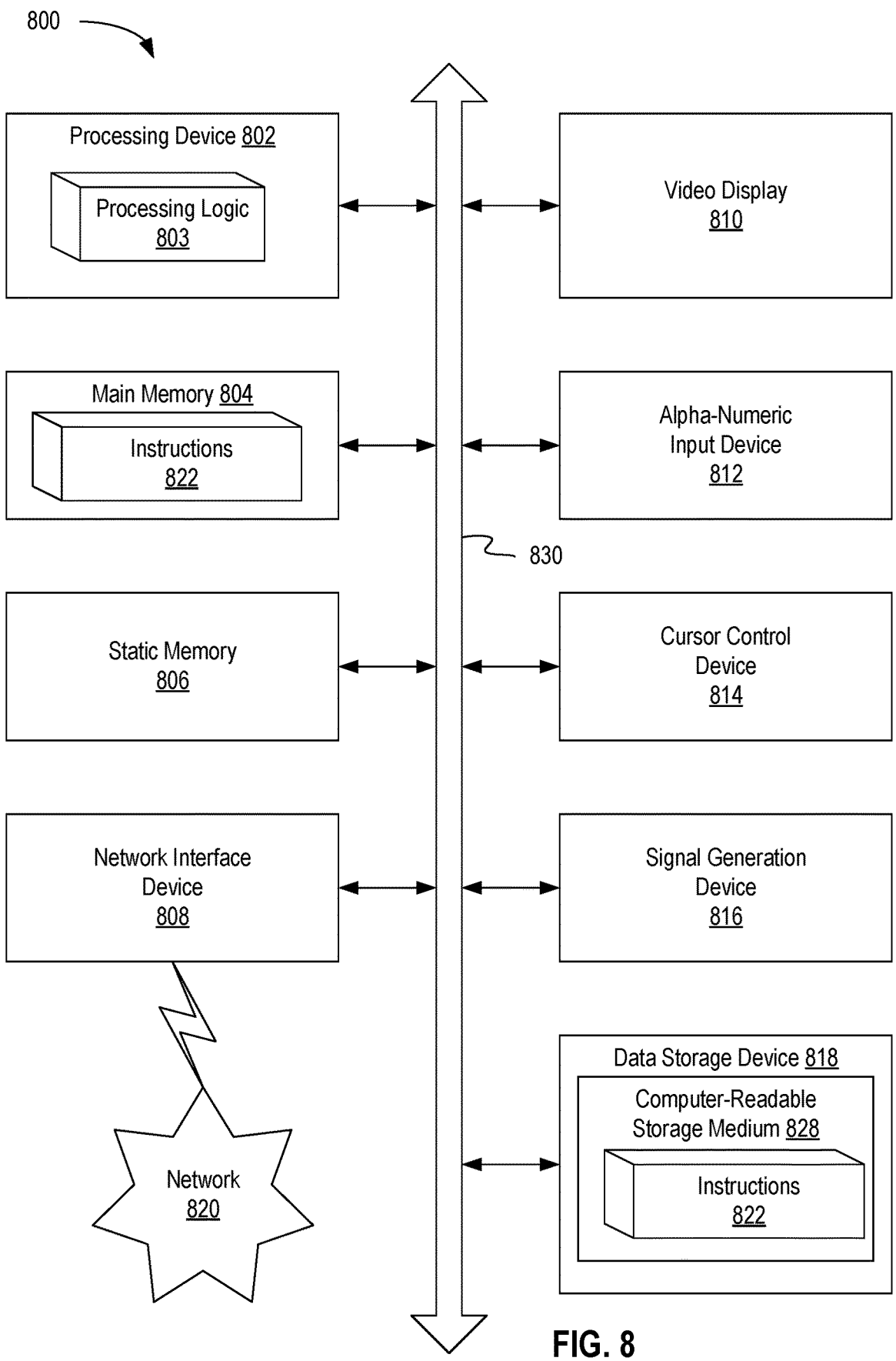
FIG. 8 depicts a block diagram of an example computer device capable of enabling efficient processing of authorization requests by cloud-bases access servers, in accordance with at least some embodiments of the present disclosure.

FIG. 8 depicts a block diagram of an example computer device 800 capable of enabling efficient processing of authorization requests by cloud-bases access servers, in accordance with at least some embodiments of the present disclosure. Example computer device 800 can be connected to other computer devices in a LAN, an intranet, an extranet, and/or the Internet. Computer device 800 can operate in the capacity of a server in a client-server network environment. Computer device 800 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which can communicate with each other via a bus 830.

Processing device 802 (which can include processing logic 803) represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 can be configured to execute instructions performing method 500 of using advanced authorization requests to improve efficiency of a cloud-based access server, method 600 of processing, by an access server, of frequently accessed policies and policy data dependencies, method 700 of preemptive generation and processing of authorization requests by cloud-based authentication services, and method 760 of validation of preemptive processing of authorization requests using ground truth.

Example computer device 800 can further comprise a network interface device 808, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 can include a computer-readable storage medium (or, more specifically, a non-transitory computer-readable storage medium) 828 on which is stored one or more sets of executable instructions 822. In accordance with one or more aspects of the present disclosure, executable instructions 822 can comprise executable instructions performing method 500 of using advanced authorization requests to improve efficiency of a cloud-based access server, method 600 of processing, by an access server, of frequently accessed policies and policy data dependencies, method 700 of preemptive generation and processing of authorization requests by cloud-based authentication services, and method 760 of validation of preemptive processing of authorization requests using ground truth.

Executable instructions 822 can also reside, completely or at least partially, within main memory 804 and/or within processing device 802 during execution thereof by example computer device 800, main memory 804 and processing device 802 also constituting computer-readable storage media. Executable instructions 822 can further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    receiving a request of a user to access a first resource of a plurality of resources;
    sending, to an access server, a first authorization request to evaluate an authorization level corresponding to the user for accessing the first resource;
    obtaining a historical data associated with one or more user sessions involving previous interactions of the user with the plurality of resources;
    predicting, based on the historical data, that the user will request access, within a target time, to a second resource of the plurality of resources with at least a threshold probability;
    sending, to the access server, a second authorization request to evaluate an authorization level corresponding to the user for accessing at least the second resource, wherein the second authorization request is to cause the access server to download an authorization data associated with the second authorization request;
    receiving, from the access server, a first authorization response indicative of the authorization level corresponding to the user for accessing the first resource; and
    receiving, from the access server, a second authorization response indicative of the authorization level corresponding to the user for accessing the second resource, wherein the second authorization response is obtained using the authorization data.

2. The method of claim 1, wherein the second resource comprises at least one of a gaming application, a video streaming application, an audio streaming application, or a database application.

3. The method of claim 1, wherein the second resource is supported by a cloud service.

4. The method of claim 1, wherein the access server comprises a unified access management (UAM) server.

5. The method of claim 4, wherein the authorization data comprises one or more UAM policies, at least one UAM policy of the one or more UAM policies specifying access rights for the second resource.

6. The method of claim 1, wherein the first authorization request comprises a request to authenticate the user.

7. The method of claim 1, wherein the second authorization request is an advanced authorization request, and wherein the second authorization response is caused by sending, to the access server, a third authorization request, wherein the third authorization request is to evaluate an authorization level corresponding to the user for accessing the second resource.

8. The method of claim 1, wherein the historical data comprises statistics of the user accessing the second resource over a predetermined historical period of time.

9. The method of claim 8, wherein the statistics of the user accessing the second resource comprises one or more correlations between the user accessing the first resource and accessing the second resource.

10. The method of claim 1, wherein the second authorization request is to evaluate an authorization level, corresponding to the user, for accessing at least the second resource and a third resource, the method further comprising:
receiving, from the access server, a third authorization response indicative of an authorization level corresponding to the user for accessing the third resource to the user, wherein the third authorization response is obtained using the authorization data.

11. A system comprising:
a memory device; and
one or more processing devices, communicatively coupled to the memory device, to:
receive a request of a user to access a first resource of a plurality of resources;
send, to an access server, a first authorization request to evaluate accessibility of the first resource to the user;
obtain a historical data associated with user sessions involving previous interactions of the user with the plurality of resources;
predict, based on the historical data, that the user will request access, within a target time, to a second resource of the plurality of resources with at least a threshold probability;
send, to the access server, a second authorization request to evaluate accessibility of at least the second resource to the user, wherein the second authorization request is to cause the access server to download an authorization data associated with the second authorization request;
receive, from the access server, a first authorization response indicative of accessibility of the first resource to the user; and
receive, from the access server, a second authorization response indicative of accessibility of the second resource to the user, wherein the second authorization response is obtained using the authorization data.

12. The system of claim 11, wherein the second resource is supported by a cloud service and comprises at least one of a gaming application, a video streaming application, an audio streaming application, or a database application.

13. The system of claim 11, wherein the access server comprises a unified access management (UAM) server, and wherein the authorization data comprises one or more UAM policies, at least one UAM policy of the one or more UAM policies specifying access rights for the second resource.

14. The system of claim 11, wherein the second authorization request is an advanced authorization request, and wherein the second authorization response is caused by sending, to the access server, a third authorization request, wherein the third authorization request is to evaluate accessibility of the second resource to the user.

15. The system of claim 11, wherein the historical data comprises one or more statistics of the user accessing the second resource over a predetermined historical period of time, and wherein the statistics of the user accessing the second resource comprises correlations between the user accessing the first resource and accessing the second resource.

16. A non-transitory computer-readable medium storing instructions thereon, wherein the instructions, when executed by a processing device, cause the processing device to:
receive a request of a user to access a first resource of a plurality of resources;
send, to an access server, a first authorization request to evaluate an authorization level corresponding to the user for accessing the first resource;
obtain a historical data associated with user sessions involving previous interactions of the user with the plurality of resources;
predict, based on the historical data, that the user will request access, within a target time, to a second resource of the plurality of resources with at least a threshold probability;
send, to the access server, a second authorization request to evaluate an authorization level corresponding to the user for accessing at least the second resource to the user, wherein the second authorization request is to cause the access server to download an authorization data associated with the second authorization request;
receive, from the access server, a first authorization response indicative of the authorization level corresponding to the user for accessing the first resource; and
receive, from the access server, a second authorization response indicative of of the authorization level corresponding to the user for accessing the second resource, wherein the second authorization response is obtained using the authorization data.

17. The non-transitory computer-readable medium of claim 16, wherein the second resource is supported by a cloud service and comprises at least one of a gaming application, a video streaming application, an audio streaming application, or a database application.

18. The non-transitory computer-readable medium of claim 16, wherein the access server comprises a unified access management (UAM) server, and wherein the authorization data comprises one or more UAM policies, each of the one or more UAM policies specifying access rights for the second resource.

19. The non-transitory computer-readable medium of claim 16, wherein the second authorization request is an advanced authorization request, and wherein the second authorization response is caused by sending, to the access server, a third authorization request, wherein the third authorization request is to evaluate the authorization level corresponding to the user for accessing the second resource.

20. The non-transitory computer-readable medium of claim 16, wherein the historical data comprises one or more statistics of the user accessing the second resource over a predetermined historical period of time, and wherein the statistics of the user accessing the second resource comprises one or more correlations between the user accessing the first resource and accessing the second resource.

* * * * *